United States Patent
Madison et al.

(10) Patent No.: US 7,350,231 B2
(45) Date of Patent: *Mar. 25, 2008

(54) SYSTEM AND METHOD FOR CONTROLLING ACCESS TO DIGITAL CONTENT, INCLUDING STREAMING MEDIA

(75) Inventors: Justin Madison, Richardson, TX (US); Anthony Rodiger, The Colony, TX (US); Ajay Chintala, Addison, TX (US)

(73) Assignee: Yahoo ! Inc., Sunnyvale, CA (US)

( * ) Notice: Subject to any disclaimer, the term of this patent is extended or adjusted under 35 U.S.C. 154(b) by 756 days.

This patent is subject to a terminal disclaimer.

(21) Appl. No.: 10/416,975

(22) PCT Filed: Jun. 6, 2001

(86) PCT No.: PCT/US01/18324

§ 371 (c)(1),
(2), (4) Date: May 15, 2003

(87) PCT Pub. No.: WO02/099640

PCT Pub. Date: Dec. 12, 2002

(65) Prior Publication Data

US 2004/0015703 A1    Jan. 22, 2004

(51) Int. Cl.
H04L 29/00    (2006.01)
(52) U.S. Cl. ...................................................... 726/10
(58) Field of Classification Search ............ 726/22–27, 726/10, 9, 21
See application file for complete search history.

(56) References Cited

U.S. PATENT DOCUMENTS

| | | | |
|---|---|---|---|
| 5,715,403 A | * | 2/1998 | Stefik .......................... 705/44 |
| 5,949,876 A | | 9/1999 | Ginter et al. |
| 6,032,260 A | * | 2/2000 | Sasmazel et al. ............. 726/10 |

(Continued)

FOREIGN PATENT DOCUMENTS

EP    0 862 104 A2    9/1998

(Continued)

OTHER PUBLICATIONS

International Search Report (PCT/US01/18324).

(Continued)

Primary Examiner—Matthew B Smithers
(74) Attorney, Agent, or Firm—James J. DeCarlo; Greenberg Traurig LLP

(57) ABSTRACT

A system and method for controlling access to digital content, including streaming media. The system includes a web server, media server and end user processor, such as a personal computer, coupled to a network. The web server cryptographically generates a ticket in response to an end user's request for access to a file. The ticket is based, at least in part, on a time at or near when the ticket is generated. The media server generates an authorization ticket, preferably using the same cryptographic algorithm as the web server. The media server authorization ticket is based, at least in part, on a time at or near when the media server receives the request for access to the file. The media server determines whether to grant access to the file by comparing the ticket, as generated by the web server, to the ticket, as generated by the media server.

39 Claims, 8 Drawing Sheets

U.S. PATENT DOCUMENTS

| | | | |
|---|---|---|---|
| 6,158,005 | A | 12/2000 | Bharathan et al. |
| 6,223,292 | B1 | 4/2001 | Dean et al. |
| 6,260,027 | B1 * | 7/2001 | Takahashi et al. ............. 705/69 |
| 6,263,432 | B1 * | 7/2001 | Sasmazel et al. ........... 713/100 |
| 6,324,650 | B1 | 11/2001 | Ogilvie |
| 6,343,302 | B1 | 1/2002 | Graham |
| 6,353,812 | B2 | 3/2002 | Frankel et al. |
| 6,487,659 | B1 | 11/2002 | Kigo et al. |
| 6,516,412 | B2 * | 2/2003 | Wasilewski et al. ........ 713/168 |
| 6,523,069 | B1 | 2/2003 | Luczycki et al. |
| 6,714,921 | B2 * | 3/2004 | Stefik et al. .................. 705/55 |
| 7,089,585 | B1 | 8/2006 | Dharmarajan |
| 2002/0004903 | A1 | 1/2002 | Kamperman et al. |
| 2002/0007452 | A1 | 1/2002 | Traw et al. |
| 2002/0147929 | A1 * | 10/2002 | Rose .......................... 713/201 |
| 2003/0069829 | A1 | 4/2003 | Gathman et al. |
| 2004/0030643 | A1 | 2/2004 | Madison et al. |
| 2004/0162787 | A1 | 8/2004 | Madison et al. |
| 2004/0172396 | A1 | 9/2004 | Vanska et al. |
| 2006/0085642 | A1 | 4/2006 | Multerer et al. |

FOREIGN PATENT DOCUMENTS

| | | |
|---|---|---|
| EP | 0 998 091 A2 | 5/2000 |
| EP | 1 016 960 A1 | 7/2000 |
| JP | 05-333775 | 12/1993 |
| JP | 08-076994 | 3/1996 |
| JP | 11-031130 | 2/1999 |
| JP | 11-032037 | 2/1999 |
| JP | 11-225143 | 8/1999 |
| JP | 2000187646 A | 7/2000 |
| JP | 2000-242604 | 9/2000 |
| JP | 2001-034467 | 2/2001 |
| WO | WO 00/58859 A | 10/2000 |
| WO | WO 01/26291 A2 | 4/2001 |
| WO | WO 02/099640 A1 | 12/2002 |
| WO | WO 02/099716 A1 | 12/2002 |
| WO | WO 03/096199 | 11/2003 |
| WO | WO 2005/048029 A2 | 5/2005 |

OTHER PUBLICATIONS

International Preliminary Examination Report (PCT/US01/18324).
International Search Report (PCT/US01/46726).
International Preliminary Examination Report (PCT/US01/46726).
Supplementary European Search Report EP 01 94 2006.
Fritz Bauspeiss, Frank Damm, "Requirements for Cryptographic Hash Functions" Computers & Security, 11 (1992) pp. 427-437.
Supplementary European Search Report EP 01 99 0856.
Joon S. Park, Ravi Sandhu, "Secure Cookies on the Web" Jul.-Aug. 2000 pp. 36-44.
International Search Report (PCT/US01/18324), date unknown.
International Preliminary Examination Report (PCT/US01/18324), Apr. 9, 2003.
International Search Report (PCT/US01/46726), Apr. 16, 2002.
International Preliminary Examination Report (PCT/US01/46726), Jun. 14, 2005.
Supplementary European Search Report EP 01 94 2006, May 3, 2005.
Supplementary European Search Report EP 01 99 0856, Jun. 3, 2005.
Japanese Office Action (JP 2003-502687) Jul. 19, 2007.

* cited by examiner

**208
PLAYLIST TABLE**

Playlist ID
Playlist Details
Authorized User Group ID

**210
PLAYLIST STREAMS
TABLE**

Playlist ID
Stream ID
Sort Order

**204
STREAMS TABLE**

Stream ID
Stream Details
URL Prefix
Filename

**202
UNIVERSAL INFO
TABLE**

Security Key
Security Interval
Hostname

**206
AUTHORIZED USER
TABLE**

End User ID
Authorized User Group ID

SYSTEM AND METHOD FOR CONTROLLING ACCESS TO DIGITAL CONTENT, INCLUDING STREAMING MEDIA

BACKGROUND OF THE INVENTION

1. Field of the Invention

The present invention relates generally to controlling access to digital content and, more particularly, to ticket-based systems and methods for limiting access to streaming media, wherein the ticket is based, in part, on a time component.

2. Description of Related Art

With the advent of the Internet and the World Wide Web, an industry has developed around the delivery of digital content, such as streaming media content. By way of example, streaming media may be used for any of a number of purposes, including entertainment, distance learning and corporate purposes. Entertainment companies stream movies and sporting events, distance learning companies stream educational content, and corporations stream training materials.

With many such uses of streaming media, controlling access to the content is imperative. For example, entertainment companies may charge end-users for each viewing of an item of streaming media, referred to in the entertainment vernacular as "pay-per-view." Similarly, distance learning companies charge students for access to on-line educational courses, and thus for access to streaming media. Corporate content is often confidential, and thus also requires controlled access.

Accordingly, systems have been developed to limit access to streaming media. The current industry standard for limiting access to streaming content involves the streaming media server authenticating end-users before providing the streaming media content. More specifically, the streaming media server typically includes a software plug-in of compiled code that contains the logic for determining whether or not to grant access to the streaming media. Such an authentication plug-in, however, is often complicated and difficult to develop and maintain. For example, if the need arises to change to logic for granting access to the streaming media content, altering the compiled plug-in on the streaming media server is difficult. Furthermore, with all of the logic residing at the streaming media server, the streaming media server must have direct access to a database or distributed message passing service. Similar problems exist with systems used for controlling access to other forms of digital content. Accordingly, a need exists for an improved system and method for controlling access to digital content, particularly streaming media content, and authorizing end users.

SUMMARY OF THE INVENTION

The present inventions solves this and other needs by providing a system and method for controlling access to digital content, such as audio, visual, video, textual and streaming media. One system and method according to the present invention controls access to streaming media and includes a web server, media server and end user processor, such as a personal computer, coupled to a network.

In operation, the web server cryptographically generates a ticket in response to an end user's request for access to a file. The ticket is based, at least in part, on a time at or near when the ticket is generated. In certain embodiments, the ticket is based on additional information, including, for example, a security time interval, or an identifier of the end user.

Prior to a media server providing access to the requested file, the media server generates an authorization ticket, preferably using the same cryptographic algorithm as the web server. The media server authorization ticket is based, at least in part, on a time at or near when the media server receives the request for access to the file. The media server determines whether to grant access to the file by comparing the ticket, as generated by the web server, to the ticket, as generated by the media server.

In one embodiment, if the tickets do not match, then the time at which the web server generated the ticket differs from the time at which the media server generated the ticket by more than a predetermined amount, and the ticket can be logically thought to have "expired." Accordingly, the media server does not grant access to the media content. If the tickets match, then the tickets were generated within an authorized time interval, and the media server grants the end user access to the requested media content.

BRIEF DESCRIPTION OF THE DRAWINGS

FIG. 2 is a schematic illustrating the database according to one embodiment of the present invention;

DETAILED DESCRIPTION OF PREFERRED EMBODIMENTS

Figure 1:
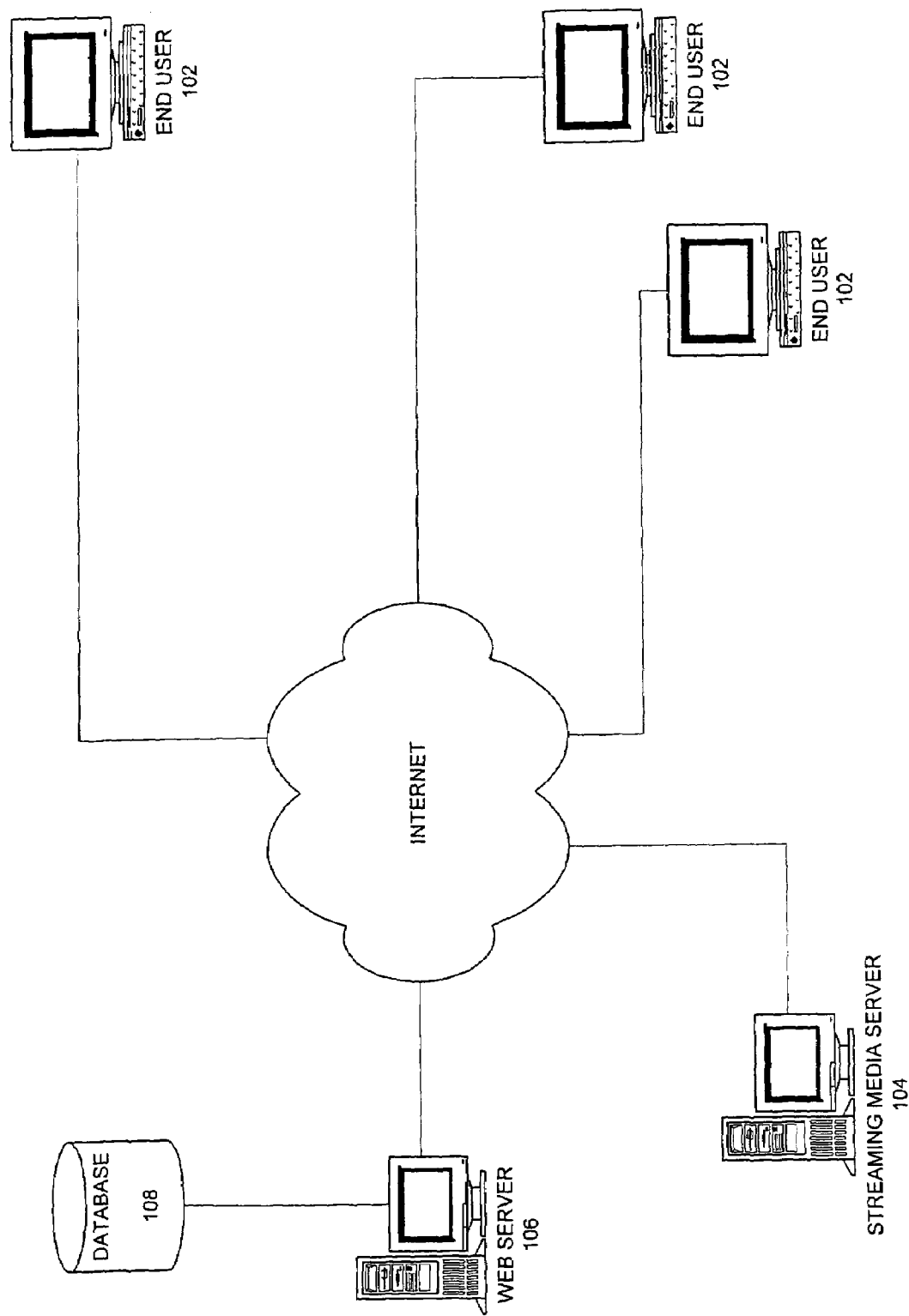
FIG. 1 is a schematic illustrating the system according to one embodiment of the present invention.

Certain preferred embodiments of the present invention will now be described with reference to the drawings. Although the invention for controlling access to content is described in the context of controlling access to streaming media files, it is to be understood that the present invention is applicable to all types of media or files. Furthermore, one skilled in the art will recognize that although the embodiments discussed herein relate to on-demand streaming media, the present embodiment is also applicable to live streaming media.

In general, the system of the present embodiment includes end user processors 102, a streaming media server 104 and a web server 106 having a content management (CM) database 108, all of which are coupled to the Internet. The end user processors 102 include an Internet browser, such as that provided by the Microsoft Corporation under the name INTERNET EXPLORER or provided by Netscape Communications under the name NETSCAPE NAVIGATOR, and a streaming media player, such as that provided by the Microsoft Corporation under the name WINDOWS MEDIA PLAYER or that provided by Real Networks, Inc. under the name REALPLAYER. The web server 106, provides a website accessible by the end users 102. The website, in turn, includes links that can be activated by the end users 102 for accessing streaming media content residing on the streaming media server 104.

It is to be understood that the present invention may be implemented utilizing any number of computer technologies. For example, although the present embodiments relate to providing access to content via the Internet, the present invention may be utilized over any computer network, including, for example, a wide area network. Similarly, the end user processors 102 may be any device that may be coupled to the network, including, for example, personal digital assistants, web-enabled cellular telephones, hard-wired telephones that dial into the network, mobile computers, personal computers, Internet appliances and the like. Furthermore, the servers described herein may be of any type, running any software, and the software modules, objects and plug-ins described herein may be written in any programming language. Lastly, the database and storage devices described herein may utilize any storage technology, including, for example, local computer memory, network attached storage, and any known storage medium, such as magnetic or optical.

An exemplary representation of the CM database 108 is illustrated in FIG. 2. As shown, the database 108 includes information universally applicable to all items of streaming content and several tables of related data. The universal information 202 includes a security key, a security time interval and the name ("Hostname") of the streaming media server 104 on which the content resides. The security key and the security interval are used in authorizing end users 102 to access the content and, therefore, are preferably maintained in secret and set by the owner of the content. The security key and security interval are used for controlling access to all content, although in alternate embodiments each content file has its own security key and security interval associated therewith.

The CM database 108 further includes a series of tables containing content or stream identifying information. More specifically, the Streams Table 204 includes a record for each item of streaming content, as identified by a unique stream identifier (ID). Furthermore, each record includes: the stream details that describe the content file, including, for example, the creation date of the content file, a description of the file, an identification of whether the content is audio and or video, the platform to which the content relates, the date on which the content was last modified, any codec necessary for viewing of the content, the length and size of the content, the expiration date (if any) of the content, the stream type, such as .asf or .rm, title of the content, author of the content, status of the content, copyright notice for the content, bit rate of the content and the like. Each record also includes: the prefix used to generate a link to the media server 104 ("URL Prefix"); and the name of the content file ("Filename"), as stored on the streaming media server 104. It should be understood that the filename may point to an actual path on storage coupled to a streaming media server 104 for on-demand content or the filename may point to an alias, port or channel for a live stream.

The database 108 also includes tables containing "playlist" information. A client's playlist is generally a group of one or more content files logically associated for the purpose of being made available as a group. Each content file identified as part of a playlist can also be made available individually. Such playlist information is contained within the Playlist Table 208 and the Playlist Streams Table 210. In general, the Playlist Table 208 includes records identifying each playlist, as identified by a playlist ID. Each record further includes playlist details, including, for example, the playlist format (such as Windows Media Player or Real-Player), the playlist description, the playlist name, and the like, and the authorized user group ID for the playlist.

The authorized user group ID corresponds to a group of end users 102 that are authorized to view the particular playlist. More specifically, the database 108 further includes an Authorized User Table 206 that correlates each end user 102, as identified by a unique end user ID, to one or more authorized user group IDs. In order for an end user 102 to view a playlist, the end user 102 must be identified as part of the authorized user group ID for that content file. In certain alternate embodiments, no authorized group ID is used, while in other alternate embodiments each content file has an authorized group ID associated therewith.

The Playlist Streams Table 210 includes records correlating each playlist, as identified by the playlist ID, with the constituent content files, as identified by stream ID. Each record also contains the information indicative of the order of each content file in the playlist ("Sort Order").

Having described the components utilized in the present embodiment, the process of controlling access to the streaming media content will now be described. By way of overview, an authorization software component located on the web server 106 generates a hash value or "ticket" based upon public key information, private key information and the then current time. The public key is a unique identifier for the streaming content requested by the end-user 102 and the end user's user ID. The private key includes a security key and security time interval set by the owner of content.

The streaming media server 104 on which the requested content resides receives the stream request, which includes the public key, and the ticket as generated by the web server 106. The streaming media server 104 proceeds to use locally stored private key information to generate its own version of the ticket. The streaming media server 104 either denies or provides access to the requested streaming media content based on a comparison of the tickets as generated by the streaming media server 104 and web server 106.

Figure 3:
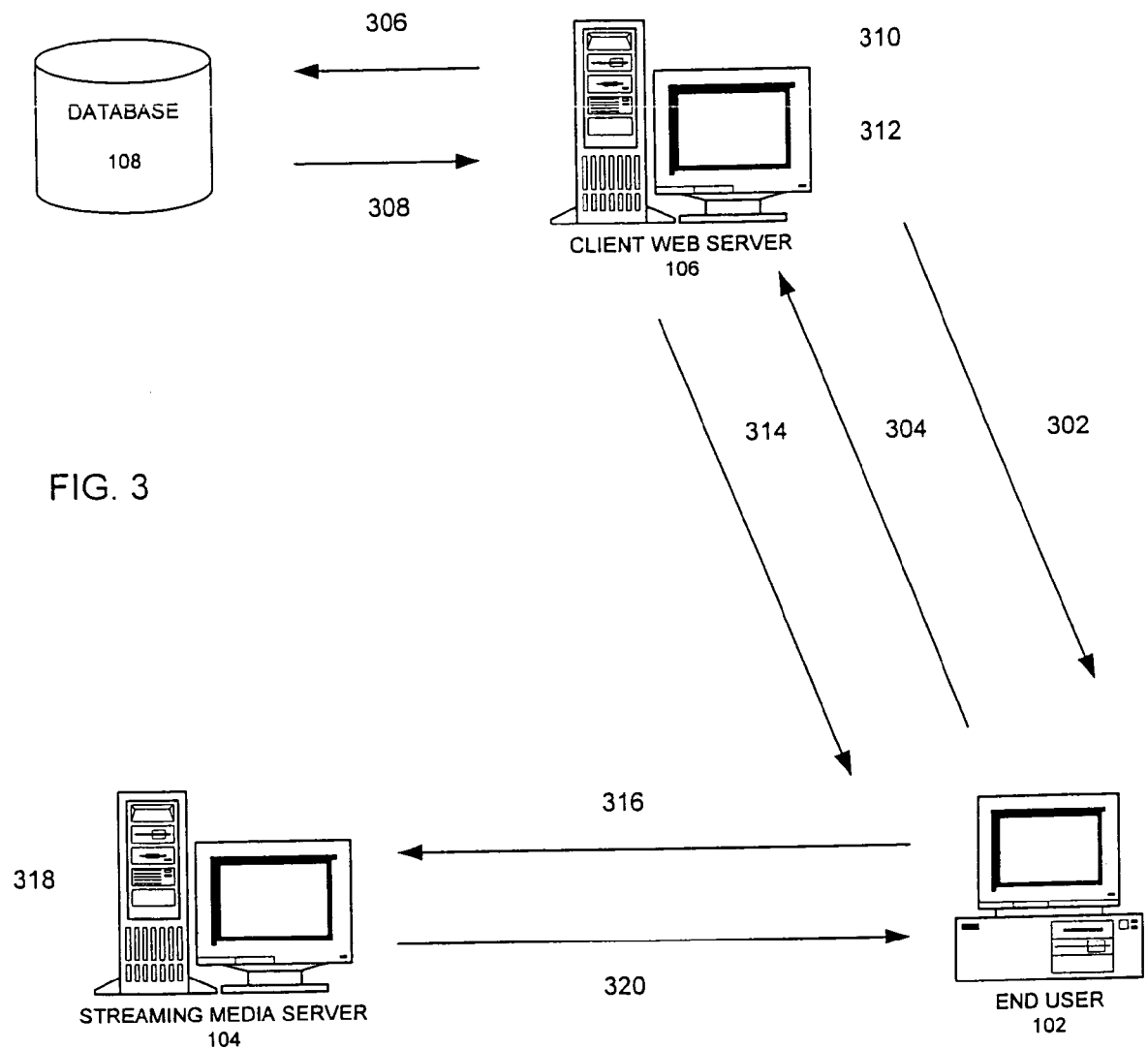
FIG. 3 is a schematic illustrating the workflow according to one embodiment of the present invention.
Figure 4:
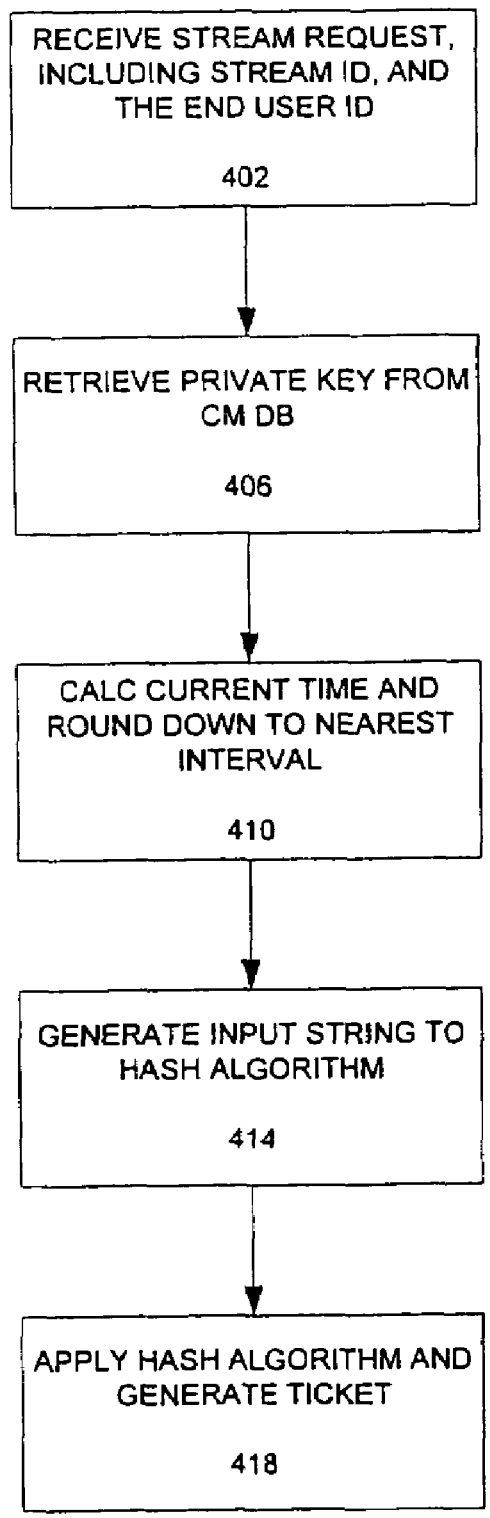
FIG. 4 is a flowchart illustrating the process of generating a ticket according to one embodiment of the present invention.
Figure 5:
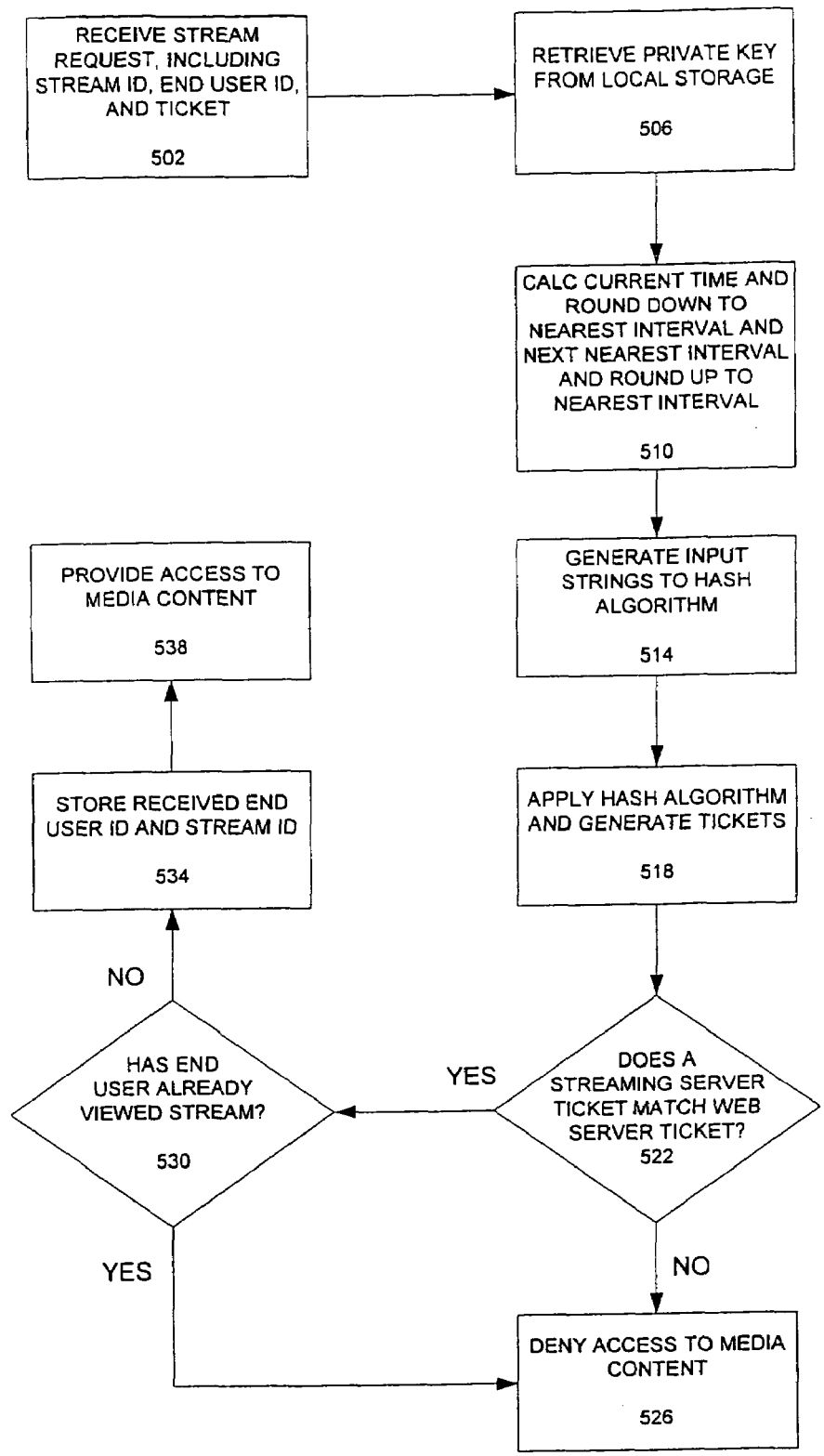
FIG. 5 is a flowchart illustrating the process of determining whether to provide access to a item of streaming media content according to one embodiment of the present invention.

The process of controlling access will now be described in greater detail with reference to the workflow diagram of FIG. 3 and the flow charts of FIGS. 4 and 5. In the present example, the end user 102 requests access to an individual streaming media content file. Initially, the web server 106 provides a web page requesting the end user to log in to an authorization application and presenting the end user with the option of viewing certain streaming media. Step 302. For example, such a page may include a form requesting the end user to select for viewing one of several content files, each of which has its own stream request link, to provide its end user ID (which the owner of the content previously assigned and provided to the end user) and to provide a credit card number so that the end user may be charged for access to the selected content. In an alternate embodiment, the end user previously registered with the owner of the content by providing the end user's contact information and billing information, which the owner stores in a table in the database along with the assigned end user ID.

In response to the web page, the end user provides the end-user's user ID and activates a link, thereby logging into the authorization application and requesting access to the particular streaming media content file associated with the link. Step 304. An exemplary stream request, wherein the stream ID is represented by "123456," is as follows:

<A href http://webserver.company.com/getstream.asp?ID=123456>

In the present embodiment the authentication application is a ".dll" software component residing on the web server 106. However, one skilled in the art will recognize that any other programming language or technology, such as, for example, an active server page (ASP) or servlet, could be used to implement the functionality described herein. Irrespective of the particular programming technology, it is preferable that the authentication application run on the web server 106 to alleviate any processing bottlenecks on the end user processor 102.

Once the end user logs into the authentication application and the web server 106 receives the stream request and the end user ID from the end user, the web server 106 continues by dynamically generating the authentication ticket and dynamically generate a link to the selected content file. More specifically, under control of the authentication application, the web server 106 issues a request to the database 108 for the private key for use in generating the authorization ticket. Step 306. The web server 106 issues a database query to retrieve from the CM database 108 the private key, comprising the security key and security interval associated with the requested content file. In response, the CM database 108 returns the private key to the web server 106. Step 308.

Having obtained the private key from the database 108, the web server 106 generates the ticket. Step 310. As described more fully with reference to FIG. 4, the web server 106 utilizes the private key, stream ID, end user ID, the current time and a hash algorithm to generate the ticket. In the present embodiment, the web server 106 can use the stream ID to generate the ticket because the stream ID of the requested content is included in the stream request link activated by the end user in step 304. In alternate embodiments, however, the stream request provided by the end user includes unique identifying information other than the stream ID, such as, for example, the title, author and/or filename of the content. In such an embodiment, the web server 106 searches the Streams Table 204 and retrieves the stream ID based on the identifying information contained in the stream request. In yet another alternate embodiment, the stream request includes a unique identifier other than the stream ID, such as the filename or path, which the system uses to generate the ticket.

Once the ticket is generated, the web server 106 generates the link to the requested content on the media server 104. More specifically, based on the illustrative stream request shown above, the media player residing at the end user processor 102 makes a call to "webserver.company.com" (i.e., the web server 106) that will execute the "getstream.asp" program for dynamically generating the link to the media server 104. Step 312. One skilled in the art will recognize that although the "getstream" application has an Active Server Page (or ASP) extension, it is not necessary to use ASP technologies. Rather, any programming or scripting language or technology, such as a ".dll" component, could be used to provide the desired functionality. As with the authentication application, it is preferred, however, that the program run on the server side so as to alleviate any processing bottlenecks at the end user processor 102. The "getstream.asp" program functions to cause the web server 106 to make a call to the CM database 108 to retrieve the data necessary to dynamically generate the link to the media server 104. More specifically, the web server 106 retrieves the Hostname from the Universal Info Table 202 and the URL Prefix and Filename from the Streams Table 204. The "getstream.asp" program also appends the stream ID, the ticket and the end user ID to the end of the link. The web server 106 then returns the link to the media player at the end user processor 102. Step 314.

An illustrative link to the media file is as follows, wherein: the URL Prefix is requested by "mms://"; the Hostname is represented by "mediaserver.company.com"; the Filename is represented by "stream1.asf"; the stream ID of the requested item of content is represented by "123456"; the ticket is represented by "uvw123xyz"; and the end user ID is represented by "abc123def".

<REF href="mms://mediaserver.company.com/stream1.asf?ID=123456&TICKET=uvw123xyz&USER_ID=abc123def">

Having received the link, the end-user processor 102 proceeds to request the streaming media content. Step 316. More specifically, the media player residing on the end user processor 102 makes a call to "mediaserver.company.com" (i.e., the streaming media server 104), as identified in the link. As part of the call, the media player provides the streaming media server 104 with the copy of the requested content's stream ID, the ticket generated by the web server 106 and the end user ID.

Having received the link, which includes the stream ID, the end user ID and the ticket, the streaming media server 104 proceeds to determine whether or not to grant the end user access to the requested content. Step 318. As described in greater detail below with reference to FIG. 5, the streaming media server 104 determines whether or not to grant access by independently generating a ticket based on locally stored private key information and the stream ID and end user ID contained in the link. In general, if the ticket generated by the streaming media server 104 matches the ticket as generated by the web server 106, the streaming media server 104 provides the requested streaming media content to the end user processor 102. Step 320.

The process of generating the ticket by the web server 106 will now be described in greater detail with reference to FIG. 4. As noted above, the ticket generation process is preferably performed by an authorization software plug-in residing at the web server 106. In the present embodiment, the process beings with the web server 106 receiving the stream request, including the stream ID, and the end user ID. Step 402. The web server 106 then proceeds to access the database 108 to retrieve the private key information associated with the requested stream ID. Step 406. Such private key information includes the universal security key and the security interval. In an alternate embodiment, each stream has its own security key and security interval stored as fields in the Streams Table 204, which the web server 106 retrieves based on the stream ID contained in the stream request.

As noted above, the web server 106 also uses the current time to generate the ticket. More specifically, the web server 106 calculates the current time and rounds the time down to the nearest multiple of the security interval. Step 410. The present embodiment utilizes Universal Coordinated Time (UTC) in seconds, as generated by the C programming language standard library function "time ( )". Exemplary Perl programming code for generating the time as rounded down to the nearest multiple of the security interval (represented by the variable "$time") is as follows, wherein the variable "$interval" corresponds to the security interval, which equals 15 minutes.

```

# example of 15 minute ticket expiration/security interval

$interval=15*60
$time=int(time( )/$interval)*$interval;
```

By way of example, if the current time was May 31, 2000 at 2:16:07 pm, Central Time, the function "time ( )" returns a value of approximately "959800567". Rounding down this UTC value to the nearest 15 minute interval results in a value of approximately "959800500," which represents a time of May 31, 200 at 2:15:00 pm Central Time.

It is to be understood that the foregoing exemplary code may be modified and still be within the scope of the present invention. For example, the security interval need not be in minutes; the interval may be represented in other units of time so long as an appropriate conversion is performed so that the interval is represented in the unit of time utilized by the "time ( )" function. Furthermore, in alternate embodiments the current time is based on a standard other than UTC. In one such embodiment, the time standard is unique to the web server 106 and streaming media server 104. It is also to be understood that it is within the scope of the present invention to have the end user processor 102 calculate the time and pass the value to the web server 106 for use in generating the authorization ticket. In still further alternate embodiments, the security interval is selected so that the standard time is simply truncated to a desired number of digits.

Once the web server 106 has the input values to the hash algorithm-the public key information, private key information, and the time value-the web server 106 generates the input string to the hash algorithm. Step 414. In the present embodiment, the hash algorithm is the "MD 5" message digest algorithm. Also in the present embodiment, the media server 104 and web server 106 utilize the same algorithm.

It is to be understood that it is within the scope of the present invention to utilize essentially any hash or cryptographic algorithm to generate the ticket. Furthermore, the two servers generating the tickets (in the foregoing embodiment, the web server 106 and the streaming media server 104) preferably generate the same ticket based on the same inputs or tickets within a known deviation of each other based on the same inputs. In alternate embodiments one of a plurality of potential algorithms are used to increase security. By way of example, such embodiments use one randomly selected algorithm from a plurality of potential algorithms or can select one of a plurality of algorithms based on the requested content, the date or time of the request, the particular end user, the entity owning the content, and the like. In such embodiments, the system passes to the media server an indication of the algorithm used by the web server, or the media server includes logic that causes it to select and use the same algorithm utilized by the web server.

Any arrangement of the input values may be used as the input string so long as the input string is valid for the particular hash algorithm being used and so long as the streaming media server 104 knows the arrangement of the input string. In the present embodiment the following predetermined arrangement is used, wherein "T" represents a digit of the time value, "K" represents an alphanumerical character in the security key, "S" represents a digit of the stream ID (including any necessary leading padding characters) and "U" represents an alphanumerical character of the end user ID (including any necessary leading padding characters).

TTTTTTTTTT-
KKKKKKKKKKSSSSSSSSSSUUUUUUUUUU

In alternate embodiments input strings may be of different lengths.

Having generated the hash algorithm input string, the web server 106 applies the hash algorithm to the input string, thereby generating the ticket. Step 418.

The process of the streaming media server 104 determining whether to grant access to the requested content stream will now be discussed with reference to FIG. 5. As an initial matter, it should be noted that, although not required, the media server of the present embodiment 104 generates three authentication tickets, each based on a different time value, for use in determining whether to grant access. Furthermore, as with the web server functionality, it is preferable that the process of determining whether to grant access is implemented in an authorization software component residing on the media server 104.

In determining whether to grant access, the streaming media server 104 first receives the stream request, including the stream ID, end user ID and ticket, from the media player residing on the end user's processor 102. Step 502. Once the stream request is received, the media server 104 generates the input string to the hash algorithm. In this regard, the media server 104 retrieves from local memory the private key information, namely the security key and security interval. Step 506. Preferably, the media server 104 stores the private key information in local memory, however, in alternate embodiments the media server 104 stores the information in an active directory tree accessed by, for example, Light-Weight Directory Access Protocol provided by the Microsoft Corporation, or in a remote database. In still another alternate embodiment, the media server 104 retrieves the private key information by accessing the database 108 via a network connection, such as Local Area Network (LAN).

As did the web server 106, the media server 104 also calculates the current time and rounds the time down (i.e., earlier in time) to the nearest multiple of the security interval. Step 510. Unlike the web server 106, however, the streaming media server 104 also calculates a second time value equal to the current time rounded down to the next nearest multiple of the security interval below (i.e., earlier than) the first time value calculated by the media server 104. Step 510. The media server 104 further calculates a third time value equal to the current time rounded up (i.e., later in time) to the nearest multiple of the security interval. Step 510.

The media server 104 then uses the retrieved private key information, the received public key information and the three time values to generate three corresponding hash input strings. Step 514. The media server 104 then applies each of the three input strings to the hash algorithm, thereby generating three tickets. Step 518.

Having independently generated the tickets, the media server 104 then determines whether any of the tickets generated by the media server 104 match the ticket as generated by the web server 106. Step 522. If the tickets do not match, then it is likely that the stream request is not authentic and/or has expired (i.e., was generated by the media server 104 at a time outside of the security interval as measured from the time of the user's request). Accordingly, the media server 104 denies access to the requested content. Step 526

If the tickets do match, then it is likely that the stream request is both authentic and within the security interval. However, prior to granting access, the media server 104 first determines whether the end user has already requested access to and viewed the same content. Step 530. The media server 104 maintains, preferably in local memory, a list of end user IDs and corresponding stream IDs to which the end user has been granted access. To determine whether the end user has already viewed the requested content, the media server 104 accesses memory to determine whether the received end user ID and stream ID have previously been stored. If the end user ID and stream ID have previously been stored, then the end user is denied access to the requested content. Step 530.

If the received end user ID and stream ID have not previously been stored, the media server 104 proceeds to store the end user ID and stream ID in memory (step 534) and provides the end user access to the content. Step 538. As such, storing the end user ID and stream ID provides an added, optional level of security protection that prevents end users from sharing the link pointing to the requested content with others.

It is to be understood that the use of three tickets is preferable to account for a lack of synchronization between the local time of the web server 106 and the local time of the media server 104. Furthermore, in certain circumstances the first ticket generated by the media server 104 (i.e., based on the current time rounded down to the nearest multiple of the security interval) will not match the first ticket generated by the web server 106 even though the end user is authorized. For example, given a security interval of 15 minutes, if the web server 106 generates the ticket at 12:14:00 pm and the media server 104 generates its first ticket at 12:16:00 pm, on the same day in the same time zone, the tickets will not match even though the request is within the security interval. The web server will generate the ticket based on a time value corresponding to 12:00:00 pm, while the media server 104 will generate a ticket based on a time value corresponding to 12:15:00 pm. Accordingly, in the present embodiment the media server 104 generates the second ticket based on the then current time rounded down to the next nearest multiple of the security interval; in the present example, a time value corresponding to 12:00:00 pm. As such, the second ticket would match the ticket as generated by the web server 106. Similarly, it is possible for access to be granted to an end user after the security interval has elapsed. Thus, in the present embodiment the security interval should be selected to account for the use of multiple tickets. Preferably, the web server 106 and the media server 104 have clocks synchronized to within about one-half of the security interval.

It is to be understood that it is also within the scope of the present invention for the media server 104 to generate one or more different tickets as an alternative to the three tickets in the foregoing embodiment. Furthermore, although the foregoing embodiment describes the tickets as being generated together, in parallel, it is within the scope of the invention for the media server 104 to generate and/or compare the tickets, one after another, in serial. It is also to be understood that the time values may be generated in any of a number of ways, including, for example, by simply adding or subtracting the security interval from the first time value calculated by the media server 104.

In an alternate embodiment, another level of security may be provided. Specifically, if the ticket generated by the web server 106 matches one of the tickets generated by the media server 104, then the media server 104 proceeds to determine whether the same ticket has been previously generated. The media server 104 maintains a list of tickets for which access has been granted. Such a list logically represents all "used" tickets. If the matched ticket is not on the list of "used" tickets, then the media server 104 grants access, providing the requested content to the media player residing at the end user's processor 102. As part of granting access, the media server 104 also updates the listing of "used" tickets. If the matched ticket is on the list of used tickets, then the media server 104 denies access and provides an appropriate message to the requesting end user. By tracking the used tickets, the system prevents an authorized end user from sharing the streaming request received from the web server 106 with others.

It is also to be understood that it is within the scope of the present invention to use error calculations in determining whether to grant access. For example, one error calculation involves the media server 104 generating one or more additional tickets based on the current time plus and/or minus an error interval, such as, for example, a predetermined time period (e.g., 15 minutes, 30 minutes, etc.), a set percentage of the applicable security interval (e.g., 50%, 125%, etc.) or some other error calculation. Such error calculations may be used as an alternative to the second or third time values in the foregoing embodiment or in addition thereto.

In alternate embodiments the web server 106 and media server 104 generate tickets by calculating the time value differently than the foregoing embodiment. In one exemplary embodiment, the web server 106 and media server 104 calculate the current time and round it down to or up to a multiple of some interval other than the security interval. In one such an embodiment where the security interval is 15 minutes, the web server 106 generates the ticket based on the current time rounded down to the nearest interval of 5 minutes. The streaming media server 104, in turn, generates a ticket based on the current time rounded down to the same interval of 5 minutes. If the tickets do not match, the media server 104 proceeds to generate a ticket based on the time rounded down to the next lower interval. The media server continues to generate tickets based on the next lower interval for a set number of times or until the web server and media server tickets match. Preferably, the media server 104 repeatedly generates new tickets based on time intervals the sum of which span at least the security interval. In the present example, the media server 104 generates at least three tickets, each an interval of 5 minutes, for a total of 15 minutes.

It is to be understood that it is within the scope of the present invention to entirely omit use of the end user ID in the authorization process or to use the end user ID in a manner different from that described above. For example, in an alternate embodiment the end user ID is not used as part of the input string to the hash algorithm. Instead, the database 108 also includes tables for tracking which end users have requested access to the content. Such an embodiment includes a Viewing User (Streams) Table that contains records correlating content, as identified by stream ID, with end users, as identified by end user IDs, that have accessed or viewed the content stream. The embodiment similarly includes a Viewing User (Playlists) Table that contains records correlating playlists, as identified by playlist ID, with end users, as identified by end user IDs, that have accessed or viewed the playlist. Before generating the authorization ticket, the web server checks the appropriate Viewing User Table to determine whether the same end user has requested access to a particular stream or playlist. In the event an end user has previously requested access, the web server either denies access or provides a web page to the end user indicating that the end user will be charged again for the subsequent access. The tables are automatically cleared after a period of time, such as the security interval or some period in excess thereof.

It is to be understood that the present invention may also be embodied in relatively more complex systems, for example, ones in which a service provider operates web servers, streaming media servers, and playlist servers, on behalf of its clients-the owners of the content. One such an embodiment will now be described with reference to FIGS. 6-8. It will be understood by one skilled in the art that much of the functionality of the present embodiment is the same as that of the embodiment of FIG. 3 and, as such, can be implemented by any of the same technologies.

Figure 6:
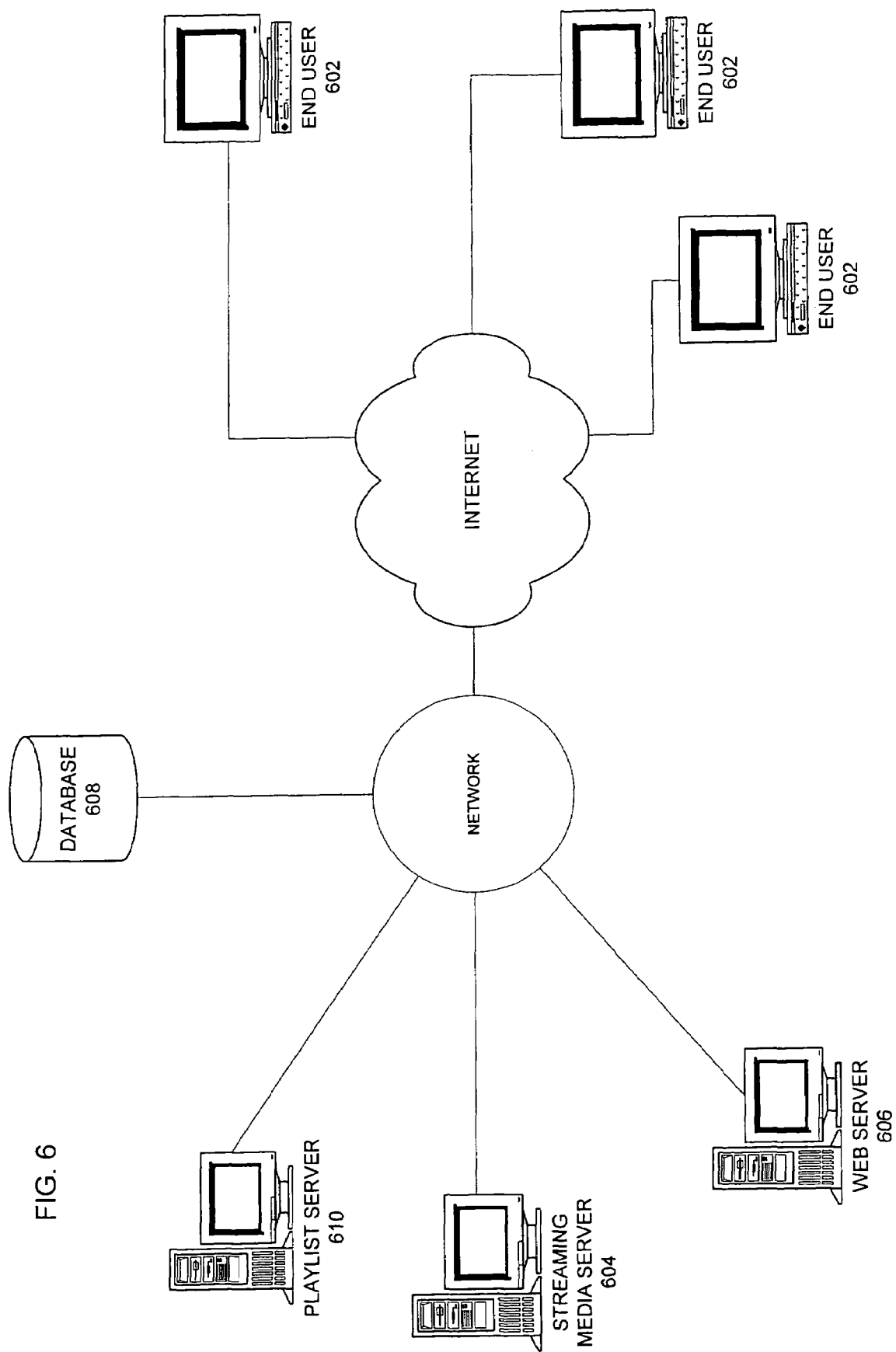
FIG. 6 is a schematic illustrating the system according to an alternate embodiment of the present invention.

As shown in FIG. 6, the system includes several components similar to those of the embodiment of FIG. 1, including end user processors 602, one or more streaming media servers 604, and one or more web servers 606, including a database 608, all of which are couple to the Internet or other network. Additionally, the system of the present embodiment also includes a playlist server 610 that is also operated by the service provider. Preferably, the web server 606, streaming media servers 604, including the database 608, and playlist server 610 are connected to the service provider's network, such as a local area network (LAN) or wide area network (WAN), and the Internet.

Figure 7:
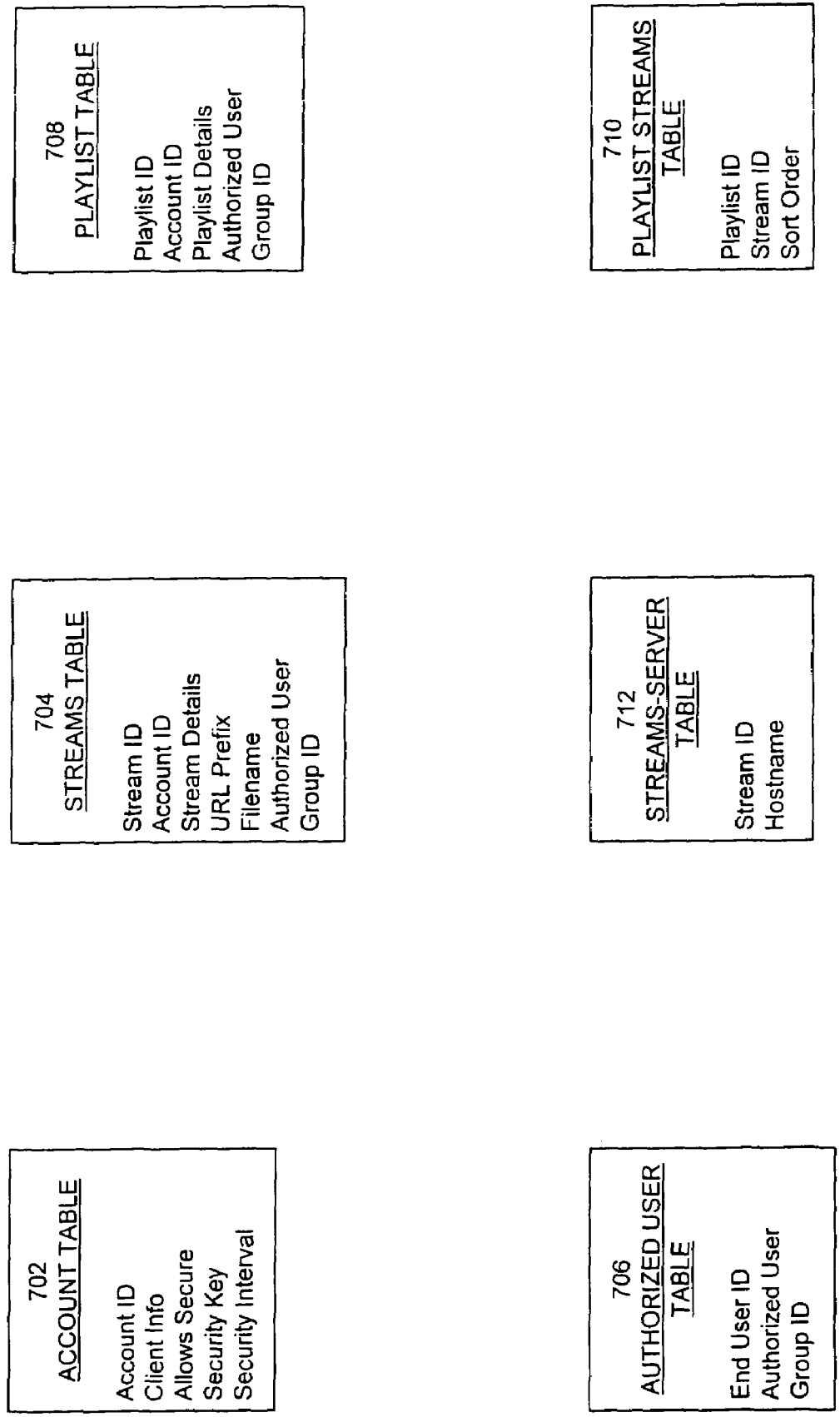
FIG. 7 is a schematic illustrating the database according to an alternate embodiment of the present invention.

In general, the database 608 includes the same information contained in the database of the embodiment of FIG. 2, however, the information is stored on a client account-by-client account basis. As shown in FIG. 7, the database 608 includes an Account Table 702 that includes a record for each client, as identified by an Account ID. Each record further includes: client-identifying information ("Client Info"), such as client name, address, billing information, and the like; an indication as to whether or not the client's content is secure ("Allows Secure"); the client's security key ("Security Key"); and security interval ("Security Interval").

As with the embodiment of FIG. 2, the present database 608 also includes a Streams Table 704, which includes stream identifying information for each content file, as identified by stream ID, an Authorized User Table 706,which associates end user IDs with Authorized User Group IDs, a Playlist Table 708, which contains playlist identifying information for each playlist, as identified by playlist ID, and a Playlist Streams Table 710, which identifies the stream IDs associated with a given playlist ID. In addition to the information fields described in connection with the database of FIG. 2, the present Streams Table 704 and Playlist Table 708 further include a field identifying the Account ID associated with each content file and each playlist, respectively.

The present database 608 also includes a Streams-Server Table 712 that contains a record for each content file, as specified by stream ID, identifying the Hostname of the particular streaming media server 104 on which the content file resides. As with the embodiment of FIG. 2, the Hostname is the DNS name of the media server 104.

Figure 8:
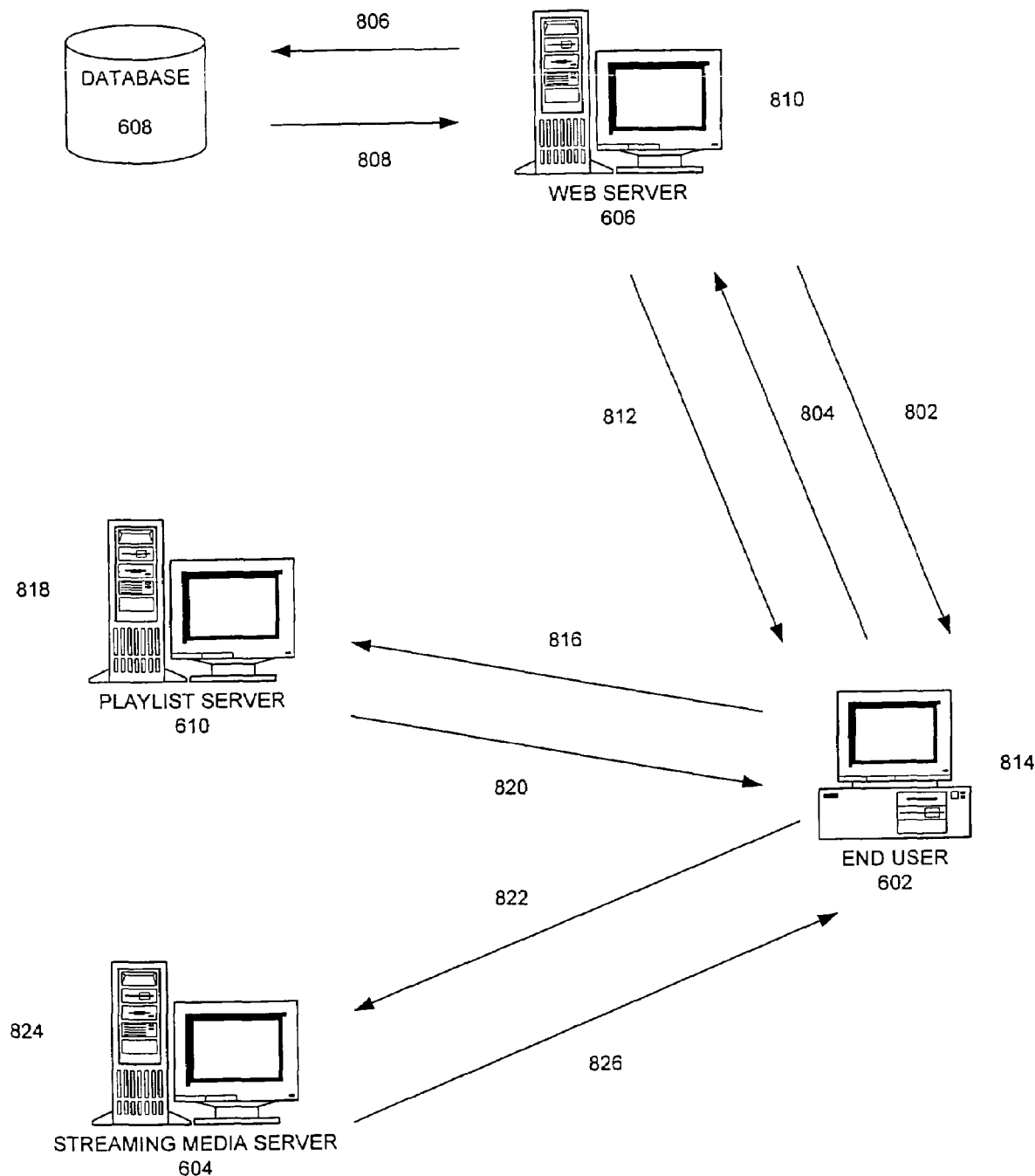
FIG. 8 is a schematic illustrating the workflow according to an alternate embodiment of the present invention.

The operation of the present embodiment will now be described with reference to the work flow diagram of FIG. 8. For purposes of the present example, the end user requests access to a playlist having one item of secure content. Initially, the web server 606 provides a web page requesting the end user to log in to an authorization application and presenting the end user with the option of viewing certain streaming media. Step 802. As with the embodiment of FIG. 3, an exemplary web page may include a form requesting the end user to select a particular content file by activating a link, provide an end user ID and provide billing information. In response to the web page, the end user provides the end-user's user ID and credit card information and activates the stream request link, thereby requesting access to a particular streaming media content file. An exemplary stream request link, where the playlist ID is "789000", is as follows:
<A href "http://playlistserver.company.com/makeplaylist-.dll?ID=789000">

When the end user activates the stream request link, a programming script running on the end user processor 602 causes the stream request link and the end user ID to be sent to the web server 606. Step 804. One skilled in the art will recognize that the end user script may be implemented in essentially any programming language, including, for example, C++, Perl, Visual Basic, Java and the like. In the present embodiment, the script is a Java script and is running in conjunction with the end user's web browser.

Once the web server 606 receives the stream request from the script, the web server 606, under the direction of an authorization software plug-in, generates the ticket. In this regard, the web server 606 issues a request to the database 608 for the private key (in the present embodiment the security key and security interval associated with the requested playlist) for use in generating the authorization ticket. Step 806. In response, the database 608 returns the private key to the web server 606. Step 808.

Having obtained the private key from the database 608, the web server 606 generates the ticket as described above with reference to FIG. 4. Using the playlist ID instead of the streamID. Step 810. As described therein, the web server 606 applies the private key, stream ID, end user ID and the time values to a hash algorithm to generate the ticket. The web server then returns the ticket and the end user ID to the web browser running on the end user processor 602. Step 812.

Having received the ticket, the script running on the end user processor 102 appends the information to the end of stream request link. Step 814. An exemplary link, wherein the playlist ID is represented by "789000," the ticket is represented by "uvw123xyz," and the end user ID is represented by "abc123def," is as follows:
<A href "http://playlistserver.company.com/ makeplaylist?ID=789000&TICKET=uvw123xyz return&USER_ID=abc123def">

The script running on the end user processor 602 then causes a call to be made to the playlist server 610, as identified in the stream request link by the Hostname "playlistserver.company.com." Step 816. Accordingly, the playlist server 810 is provided with the link, playlist ID. ticket and user ID. Under control of the "makeplaylist.dll" object, the playlist server 610 generates a redirector file, such as an ASX file where the content is in the Windows Media format. Step 818. The "makeplaylist" program may be implemented using any of a number of programs or technologies, including, for example, an ASP. The redirector file contains a link to the requested content, along with the ticket and public key (i.e., stream ID and end user ID). To generate the redirector file, the playlist server 610 accesses the database 608 to retrieve the stream ID of content file comprising the playlist and the information necessary to link to the content file, including the Hostname, URL Prefix and Filename, associated with the stream ID.

In an alternate embodiment, no end user script is utilized to append the ticket to the stream request. Instead, when the end user provides its end user ID and activates the stream request link (in step 804), the authentication application running on the web server 606 generates the ticket, appends the ticket and end user ID to the stream request link, and directly makes the call to the playlist server 610 to create the redirector file. Because the web server 606 also passes to the playlist server 610 information identifying the media player on the end user processor 602, the playlist server 610 forwards the redirector file to the media player (thereby obviating steps 812, 814 and 816).

The playlist server 610 then passes the ASX redirector file to the media player at the end user process of 602. Step 820. For purposes of the present example, the ASX file is as follows, wherein the URL Prefix is represented by "mms://"; the Hostname of the appropriate media server 604 is represented by "mediaserver.company.com"; the Filename is represented by "stream1.asf"; the requested item of content stream ID is represented by "123456"; the ticket is represented by "uvw123xyz" and the end user ID is represented by "abc123def"; and:

```
<ASX>
    <ENTRY>
        <REF href="mms://mediaserver.company.com/stream 1 .asf?
            ID=123456&TICKET=uvw123xyz& USER_ID=abc
            123def">
    <ENTRY>
<ASX>
```

The redirector file may include other information, such as metadata for the content file, or other, non-secure files, such as advertisements.

Having received the ASX file, the end-user processor 602 proceeds to request the streaming media content. More specifically, the media player makes a call to "mediaserver.company.com" (i.e., the streaming media server 604), as identified in the ASX file. Step 822. Once the call is made, the media player provides the streaming media server 604 with the copy of the requested content's stream ID, the ticket generated by the web server 606 and the end user ID.

In response to the media player's call, the streaming media server 604 proceeds to determine whether or not to grant the end-user access to the requested content. Step 824. The streaming media server 604 determines whether or not to grant access by independently generating one or more authentication tickets and comparing the tickets to the ticket generated by the web server 606. The process of generating and comparing the authorization tickets is achieved in the same manner as described with reference to FIG. 5, using the playlist ID instead of a stream ID. If a ticket generated by the media server 604 matches the ticket generated by the web server 606, the media server 604 grants the end user access to the requested content. Step 824.

It is to be understood that although the foregoing embodiments utilize a private key comprising both a security key and a security interval, it is within the scope of the present invention to utilize more or less information as the private key. For example, in alternate embodiments, no security key is used and in other embodiments, additional information is included in the private key, including, for example, a client's user name and password. Similarly, it is within the scope of the present invention to utilize a public key comprising information other than the stream ID and end user ID. For example, other content file identifying information may be used, including, for example, the file path name. Additionally, the end user ID may be omitted from the public key information in certain embodiments. In still other embodiments, the public key information includes additional information, such as the title or other stream detail of the request content file.

It is also to be understood that the functionality described as being provided by the web servers and the streaming media servers may be implemented on other devices associated therewith. For example, in certain embodiments of the present invention, the streaming media server has an associated application server coupled thereto, which implements all or part of the process of denying or granting access to content. Similarly, it is within the scope of the present invention to associate an application server with the web server to provide some or all of the functionality of the web server, including, for example, the process of generating the authorization ticket. As such, reference to a particular server is meant to include other associated servers or processors coupled to the referenced server.

It is also to be understood that the authorization tickets need not be generated at precise times. For example, the ticket is generated by the web server may be based on the time when the end user activates the stream request link, when the web server receives the private key information from the database, or any other time near the activation of the stream request. Similarly, the media server may generate authorization, for example, when the call is made from the media player, after the private key information is retrieved, or any other time near the time a call is made for the content. Furthermore, where the media server generates multiple tickets, the tickets may be based on different times or the same time. Accordingly, reference to time or the current time is meant to refer to a range and not a precise time.

Although the foregoing exemplary embodiments have been discussed in the context of controlling access to a single item of content, those skilled in the art will understand that any of the foregoing embodiments may be utilized to control access to a playlist comprising multiple secure content files. One exemplary embodiment for controlling access to a playlist will now be described with reference to the embodiment of FIGS. 6-8. Such an embodiment operates in accordance with foregoing description, with the modifications noted below. In general, the web server 606 generates a ticket for each content stream contained in the playlist based on each stream's stream ID.

The media player on the end user processor 602 passes the stream request, which includes the playlist ID, to the playlist processor 610. The playlist processor 610, in turn, generates the redirector file and returns the redirector file to the media player. The "makeplaylist.dll" object uses the playlist ID, "789000" in the present example, to construct the appropriate redirector file. More specifically, the playlist server 610 accesses the Playlist Table 708 and the Playlist Streams Table 710 to determine which content files are part of the requested playlist and the order of the content files in the playlist. The content files' filenames are retrieved from the Streams Table 704. A script running on the end user processor 602 then appends the stream IDs, tickets and end user ID to the URL linking to the corresponding content stream. In the present embodiment, all content streams are located on the same media server 604, as identified in the Streams-Server Table 712.

An exemplary ASX redirector file, including the stream IDs, tickets and end user ID appended to the URL link for the corresponding content stream, is as follows:

```
<ASX>
    <ENTRY>
        <REF href="mms://mediaserver.company.com/stream1.asf?
            ID=123456&TICKET=abc111xyz&USER_ID=
            abc123def">
        <REF href="mms://mediaserver.company.com/stream2.asf?
```

-continued

```
            ID=234567&TICKET=def222xyz&USER_ID=
                abc123def">
            <REF href="mms://mediaserver.company.com/stream3.asf?
                ID=345678&TICKET=ghi333xyz&USER_ID=
                abc123def">
    </ENTRY>
</ASX>
```

The media player then makes a series of calls to the streaming media server 604, one for each of the URL links contained in the redirector file. More specifically, the media player first makes a call to the media server 604 for access to the first content stream (in the present example, having stream ID 123456). In response to the call and as generally described above with reference to FIG. 5, the media server 604 independently generates a ticket and determines whether to grant access to the content. If access is not granted, the end user is notified as such. On the other hand, if the media server grants the end user access to the first content stream, then the media player proceeds to makes calls to the media server 604 for the remaining content streams in the playlist. With each call, the media server 604 proceeds with authorizing or denying access to the requested content stream.

It should be understood that in such an embodiment, however, it is preferable for each content stream to have an individual security interval that accounts for the total duration of the content streams played prior to the stream in the playlist. For example, in a playlist containing three content streams, each of which is five minutes in duration (as identified in Stream Details fields of the Streams Table 704), the security interval for the second stream may be five minutes longer than that for the first stream, and the security interval for the third content stream may be ten minutes longer than the interval for the first stream. By accounting for the duration of each stream in the playlist, the system helps prevent an authorized end user from receiving access to the first content stream in the playlist but not to a subsequent content stream because the ticket has expired. The security intervals may also account for any non-secure content, such as advertisements, contained in the playlist.

Other alternate embodiments control access to a playlist containing multiple secure content streams by generating a ticket based on the playlist ID. One such an embodiment operates in accordance with the description of the system of FIGS. 6-8, with the modifications noted below. In general, once the end user logs in to the authorization application and requests access to a playlist, the web server 606 generates a ticket based on the playlist ID and returns the ticket to the end user processor 602. In response, a script running on the end user processor 602 appends the ticket and end user ID to the stream request link. The following is an illustrative stream request link having the public key information appended thereto, wherein the playlist ID represented by "789000"; the ticket is represented by "xyz321abc" and the end user ID is represented by "abc123def".

<A href "http://playlistserver.company.com/makeplaylist-
    .dll?PLAYLIST_ID=789000&
    TICKET=xyz321abc&USER_ID=abc123def">

The end user processor 602 makes a call to the playlist server 610, as identified by the name "playlistserver.company.com". The playlist server 610, in turn, initiates the "makeplaylist.dll" object residing at the playlist server 610 in order to generate the redirector file. In the present embodiment, all content streams reside on the same media server 604. Unlike prior embodiments, the "makeplaylist.dll" object also appends to the end of the first URL link in the redirector file the filenames for the subsequent secure content streams in the playlist, and only the playlist ID and ticket is appended to each of the subsequent URL links. An exemplary ASX redirector file is as follows, wherein: the playlist includes three Windows Media format content files having the filenames represented by "stream1.asf", "stream2.asf" and "stream3.asf"; the playlist ID is represented by "789000"; the end user ID is represented by "abc123def"; and the ticket is represented by "xyz321abc":

```
<ASX>
    <ENTRY>
            <REF href="mms://mediaserver.company.com/stream1.asf?
                PLAYLIST_ID=789000&TICKET=xyz321abc&
                USER_ID=abc123def&STREAM=stream2.asf&
                STREAM=stream3.asf">
            <REF href="mms://mediaserver.company.com/stream2.asf?
                PLAYLIST_ID=789000&TICKET=xyz321abc">
            <REF href="mms://mediaserver.company.com/stream3.asf?
                PLAYLIST_ID=789000&TICKET=xyz321abc">
    </ENTRY>
</ASX>
```

The media player at the end user processor 602 proceeds to make a call to the mediaserver.company.com (i.e., the Hostname of the streaming media server 604) for access to the first content file. The media server 604 proceeds to generate a ticket based on the playlist ID and to grant or deny access as discussed above with regard to FIG. 5. If the media server 604 grants access to and provides the media player with the first content file in the playlist, the media server 604 creates a record in a locally stored table for the playlist ID and the corresponding ticket, and stores in the record the filenames of the subsequent content streams in the playlist, as contained in the redirector file.

When the media player subsequently calls for access to the second content stream, the media player provides the playlist ID and ticket to the media server 604. The media server 604, in turn, searches the table for the record identified by the playlist ID and ticket. If the record exists, the media server 604 provides access to the second stream and flags the stream as having been viewed by the end user with the particular ticket. If an unauthorized end user attempts to access the second stream using the same URL link, the media server 604 will deny access because in the record pertaining to the playlist ID and ticket, the second stream has been flagged as having been viewed. The same process is utilized for providing access to the remaining content streams in the playlist. As will be appreciate by one skilled in the art, this embodiment avoids any potential for incorrectly denying access to a subsequent stream in a playlist due to the time delay between granting access to the first stream and such subsequent stream.

Those skilled in the art will recognize that the method and system of the present invention has many applications, may be implemented in many manners and, as such, is not to be limited by the foregoing exemplary embodiments and examples. Moreover, the scope of the present invention covers conventionally known and future developed variations and modifications to the system components described herein, as would be understood by those skilled in the art.

What is claimed is:

1. A method for controlling access to one or more media files, the method comprising:
   a. generating a first authorization ticket based on a first time;
   b. generating a second authorization ticket based on a second time; and
   c. comparing the first authorization ticket and the second authorization ticket to enable a determination whether or not to grant access to the media files.

2. The method of claim 1 wherein step (a) occurs at approximately the first time and step (b) occurs at approximately the second time, the second time later than the first time, the method further comprising:
   granting access to die media files if the first authorization ticket matches the second authorization ticket, wherein the first authorization ticket matches the second authorization ticket based on the first time differing from the second time by less than a predetermined amount.

3. The method of claim 1 wherein step (a) occurs at approximately the first time and step (b) occurs at approximately the second time, the second time later than the first time, the method further comprising:
   denying access to the media files if the first authorization ticket does not match the second authorization ticket, wherein the first authorization ticket does not match the second authorization ticket based on the first time differing from the second time by more than a predetermined amount.

4. The method of claim 3 wherein the first authorization ticket is further based on a first time value that approximates the first time rounded down to a multiple of a time interval, and the second authorization ticket is further based on a second time value that approximates the second time rounded down to a multiple of the time interval.

5. The method of claim 1 wherein the first authorization ticket and the second authorization ticket are further based on a security key.

6. The method of claim 1 wherein the first authorization ticket and the second authorization ticket are further based on an identifier for the media files.

7. The method of claim 6 wherein the files comprise a playlist and the identifier is an identifier for the playlist.

8. The method of claim 1 wherein the first authorization ticket is generated in response to a request for access to the media files from an end user, and the first authorization ticket and the second authorization ticket are further based on an identifier for the end user.

9. The method of claim 1 further comprising:
   generating a third authorization ticket based on a third time; and
   wherein step (c) further comprises comparing the first authorization ticket to the third authorization ticket to determine whether to grant access to the media files.

10. The method of claim 9 wherein:
    generating the second authorization ticket occurs at approximately the second time, and the second authorization ticket is based on a second time value that approximates the second time rounded down to another multiple of a time interval; and
    generating the third authorization ticket occurs at approximately the third time, and the third authorization ticket is based on a third time value that approximates the third time rounded down to a multiple of the time interval, the third time value below the second time value.

11. The method of claim 10 wherein the second time equals the third time.

12. The method of claim 9 wherein:
    generating the second authorization ticket occurs at approximately the second time, and the second authorization ticket is based on a second time value that approximates the second time rounded down to a multiple of a time interval; and
    generating the third authorization ticket occurs at approximately the third time, and the third authorization ticket is based on a third time value that approximates the third time rounded up to another multiple of the time interval.

13. The method of claim 12 wherein the second time equals the third time.

14. A method for controlling access to one or more media files, the method comprising:
    a. receiving a request for the media files;
    b. receiving a first authorization ticket associated with the request, the first authorization ticket based on a first time;
    c. generating a second authorization ticket based on a second time; and
    d. determining whether to grant access to the media file by comparing the first authorization ticket and the second authorization ticket.

15. The method of claim 14 further comprising:
    e. denying access to the media files based on the first authorization ticket not matching the second authorization ticket, wherein the first authorization ticket does not match the second authorization ticket based on the first time differing from the second time by a predetermined amount.

16. The method of claim 14 wherein the first authorization ticket is further based on a first time value that approximates the first time rounded down to a multiple of a time interval, and the second authorization ticket is further based on a second time value that approximates the second time rounded down to the multiple of the time interval.

17. The method of claim 14 wherein the first authorization ticket and the second authorization ticket are further based on a security key.

18. The method of claim 14 wherein the first authorization ticket and the second authorization ticket are further based on an identifier for the media files.

19. The method of claim 18 wherein the flies comprise a playlist and the identifier is an identifier for the playlist.

20. The method of claim 14 wherein the first authorization ticket is generated in response to a request for access to the media files from an end user, and the first authorization ticket and the second authorization ticket are further based on an identifier for the end user.

21. The method of claim 14 further comprising:
    generating a third authorization ticket based on a third time; and
    wherein step (d) further comprises comparing the first authorization ticket to the third authorization ticket to determine whether to grant access to the media files.

22. The method of claim 14 wherein the request is received from a media player.

23. The method of claim 14 wherein the first authorization ticket is generated by a web server.

24. The method of claim 14 wherein the steps (a) through (d) are performed by a media server.

25. A method for an end user to receive access to one or more media files, the method comprising:

a. requesting access to the media files;
b. causing a first authorization ticket to be generated at approximately a first time, the first authorization ticket based on the first time;
c. causing a second authorization ticket to be generated at approximately a second time, the second authorization ticket based on the second time; and
d. receiving access to the media files if the first authorization ticket matches the second authorization ticket, wherein the first authorization ticket matches the second authorization ticket based on the first time differing from the second time by less than a predetermined amount.

26. The method of claim 25 further comprising:
e. supplying an identifier of the end user, wherein the first authorization ticket and second authorization ticket are further based on the identifier.

27. The method of claim 25 wherein step (b) comprises activating a link on a web page.

28. The method of claim 25 wherein step (c) comprises making a call to a media server.

29. The method of claim 25 wherein step (d) comprises a media player receiving the media flies by from a media server.

30. A system for controlling access to one or more media files, the system comprising:
a first processor operative with software to generate a first authorization ticket based on a first time;
a second processor operative with software to generate a second ticket, independently of the first processor, based on a second time; and
a third processor operative with software to receive the first authorization ticket and to determine whether to grant access to the media files by comparing the first authorization ticket and the second authorization ticket.

31. The system of claim 30 wherein the second processor is the third processor.

32. The system of claim 30 wherein the first processor is further operative to generate the first authorization ticket based on a first time value and to calculate the first time value by rounding the first time down to a multiple of a time interval, and wherein the second processor is further operative to generate the second authorization ticket based on a second time value and to calculate the second time value by rounding down the second time to the multiple of the time interval.

33. The system of claim 30 wherein the second processor is further operative to generate a third authorization ticket based on a third time, and the third processor is further operative to compare the first authorization ticket and the third authorization ticket.

34. The system of claim 33 wherein the second time equals the third time.

35. The system of claim 33 wherein the second processor is further operative to generate the third authorization ticket based on a third time value and to calculate the third time value by rounding the third time up to a multiple of a time interval.

36. The system of claim 30 wherein the first processor and second processor are further operative to generate the first and second authorization tickets, respectively, based on an identifier of the media files.

37. The system of claim 33 wherein the first processor and second processor are further operative to generate the first and second authorization tickets, respectively, based on a security key.

38. The system of claim 30 wherein the first processor and second processor are further operative to generate the first and second authorization tickets, respectively, based on an identifier of an end user requesting access to the media files.

39. A computer readable medium comprising computer code for instructing one or more processors to:
a. receive a first authorization ticket, the first authorization ticket based on a first time, the first authorization ticket associated with a media file;
b. generate a second authorization ticket based on a second time;
c. compare the second authorization ticket to the first authorization ticket; and
d. cause the media file to be transmitted based on comparison of the first authorization ticket to the second authorization ticket.

* * * * *